(12) United States Patent
Lee et al.

(10) Patent No.: US 6,691,136 B2
(45) Date of Patent: Feb. 10, 2004

(54) FAST DATA RETRIEVAL BASED UPON CONTIGUOUS CONSOLIDATION OF RECORDS ACCORDING TO FREQUENCY OF ACCESS

(75) Inventors: Walter Lee, La Mesa, CA (US); John Lipham, Danbury, CT (US); George Kisslak, Danbury, CT (US)

(73) Assignee: Fair Issac Corporation, San Diego, CA (US)

(*) Notice: Subject to any disclaimer, the term of this patent is extended or adjusted under 35 U.S.C. 154(b) by 321 days.

(21) Appl. No.: 09/747,766

(22) Filed: Dec. 22, 2000

(65) Prior Publication Data

US 2002/0103784 A1 Aug. 1, 2002

Related U.S. Application Data

(60) Provisional application No. 60/236,559, filed on Sep. 28, 2000.

(51) Int. Cl.[7] .............................................. G06F 17/30
(52) U.S. Cl. ...................................... 707/200; 707/102
(58) Field of Search .............................. 707/204, 100, 707/101, 102, 205, 200; 711/112, 111, 113, 118, 129; 709/213, 214; 705/10

(56) References Cited

U.S. PATENT DOCUMENTS

| | | | |
|---|---|---|---|
| RE26,624 E | 7/1969 | Bloom et al. | |
| 5,043,885 A | 8/1991 | Robinson | 364/200 |
| 5,499,354 A | 3/1996 | Aschoff et al. | 395/456 |
| 5,551,003 A | 8/1996 | Mattson et al. | 395/463 |
| 5,555,399 A | 9/1996 | Waldron et al. | 395/486 |
| 5,659,704 A | 8/1997 | Burkes et al. | 711/114 |
| 5,666,512 A | 9/1997 | Nelson et al. | 711/114 |
| 5,778,442 A | 7/1998 | Ezzat et al. | 711/159 |
| 5,893,139 A | 4/1999 | Kamiyama | 711/117 |
| 6,003,114 A | 12/1999 | Bachmat | 711/113 |
| 6,067,608 A | 5/2000 | Perry | 711/203 |
| 6,070,225 A * | 5/2000 | Cheung et al. | 711/112 |
| 6,269,431 B1 * | 7/2001 | Dunham | 707/204 |
| 6,389,510 B1 * | 5/2002 | Chen et al. | 709/213 |
| 6,430,539 B1 * | 8/2002 | Lazarus et al. | 705/10 |

OTHER PUBLICATIONS

R. E. Kessler and Mark D. Hill Titled "Page Placement Algorithms for Large Real–Indexed Caches"copyright 1992 ACM 0734–2071/92/1100–0338 vol. 10, No. 4, Nov. 1992, pp. 338–359.*

R. Hugo Patterson, Garth A. Gibson, Eka Ginting, Daniel Stodolsky, Jim Zelenkat Titled "Informed Prefetching and Caching" SIGOPS '95 Dec. 1995 CO, USA copyright 1995 ACM 0–89791 –715–4/95/0012.*

* cited by examiner

Primary Examiner—Diane D. Mizrahi
(74) Attorney, Agent, or Firm—Glenn Patent Group; Micheal A. Glenn

(57) ABSTRACT

The most and least frequently accessed data records are contiguously stored on static media. Additionally, a buffer in random access memory holds copies of the most recently accessed records. Updated records are copied from the buffer, and contiguously stored in a separate file on static media. Non-accessed records are contiguously consolidated.

38 Claims, 7 Drawing Sheets

FAST DATA RETRIEVAL BASED UPON CONTIGUOUS CONSOLIDATION OF RECORDS ACCORDING TO FREQUENCY OF ACCESS

CROSS-REFERENCE TO RELATED APPLICATION

This application claims priority, under 35 U.S.C. §119(e), from U.S. Provisional Patent Application Ser. No. 60/236,559 filed Sep. 28, 2000, the entirety of which is herein incorporated by reference.

BACKGROUND

1. Field of Invention

The invention relates generally to computer databases, and more specifically to the quick retrieval of data records based upon contiguous consolidation according to access frequency.

2. Background of Invention

Large amounts of data are typically stored in computer databases. Various database architectures are currently known in the art. These architectures have generally been developed during a time when computer hardware storage (both disk storage and random access memory) were relatively limited and expensive. However, these technologies have recently become significantly more powerful and less expensive. As a result, the hardware environment has changed considerably from when current database technologies were developed. Only a short time ago, the standard hard disk size was two gigabytes, and database server computers did not support more than two gigabytes of random access memory. Currently, the standard server computer is equipped with up to eighteen gigabytes of disk space, and over two gigabytes of random access memory. As a consequence of these hardware developments, much larger databases are not only now possible, but are expected by users and customers of database systems.

With the increase in size, new demands are placed on databases. Typically, a larger database results in significantly slower access time. Known database technologies were developed when less static and dynamic storage were readily available, and thus are not designed to take advantage of contemporary hardware configurations. For example, known database technologies typically rely on a highly partitioned storage strategy, that permits data to be distributed across multiple disks. Generally, each partition of the database is less than one gigabyte in size. Thus, in a large database, data records will be stored in multiple partitions, on multiple physical areas on a disk, and on multiple disks. Consequently, access to data records becomes slower as the size of the data (and thus the physical distribution) increases.

To access a data record, first the record must be located, then the read-head must be moved to the physical location of the record in order to read it. A similar set of operations is required in order to write an updated record to disk. The mechanical operation of physically moving a disk-head is much slower than executing an electronic operation, such as loading data from a disk into random access memory. Databases typically include the requirement that data records must be able to be accessed in a random rather than sequential manner (in other words, a user needs to be able to access any record, in any order). The data records of traditional databases are distributed across various physical locations. Therefore, randomly accessing a plurality of data records involves significant disk-head movement that is essentially random, resulting in lengthy average seek times. The larger the database, the greater the record distribution, and hence the slower the data access will be. In practice, when known database architectures are used to stored large databases, the system spends a significant amount of time moving the disk-heads to various physical locations on multiple disks, resulting in slow access time. Therefore, what is needed is a method and a system for facilitating quick access of data records in large databases.

SUMMARY OF INVENTION

According to an embodiment of the present invention, the most recently accessed data records are stored contiguously on static media, and the least recently accessed data records are stored contiguously on static media. Additionally, a buffer in random access memory is used to store a subset of the data records. preferably those that have been most recently accessed. When a data record is accessed, it is stored in the buffer. From time to time, the most recently accessed records from the buffer are flushed to static media, ensuring their contiguous storage. The least recently accessed records, which are stored on static media, are consolidated, such that they too are contiguously stored.

Access of data records is thus much faster than in a traditional database. The most recently accessed records are, statistically, the most likely records to be subsequently accessed. Because the most recently accessed records are in the buffer, they are accessed extremely quickly. Because these records are stored contiguously on static media, whenever one of these records is accessed from there, it is also likely that the read-head will already be proximate to the location of the record. In a traditional database system, an accessed record is not likely to be physically located proximately to a previously accessed record, and thus more disk-head movement is required. Because disk-head movement is slow, the substantial minimization thereof results in greatly increased performance.

Additionally, both a write process and a consolidator process store data records on static media contiguously in blocks. Therefore, there is very little movement of the disk write-head compared to that required by a traditional database system to store the same number of records across multiple physical disk locations.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

I. System Overview

Figure 1A:
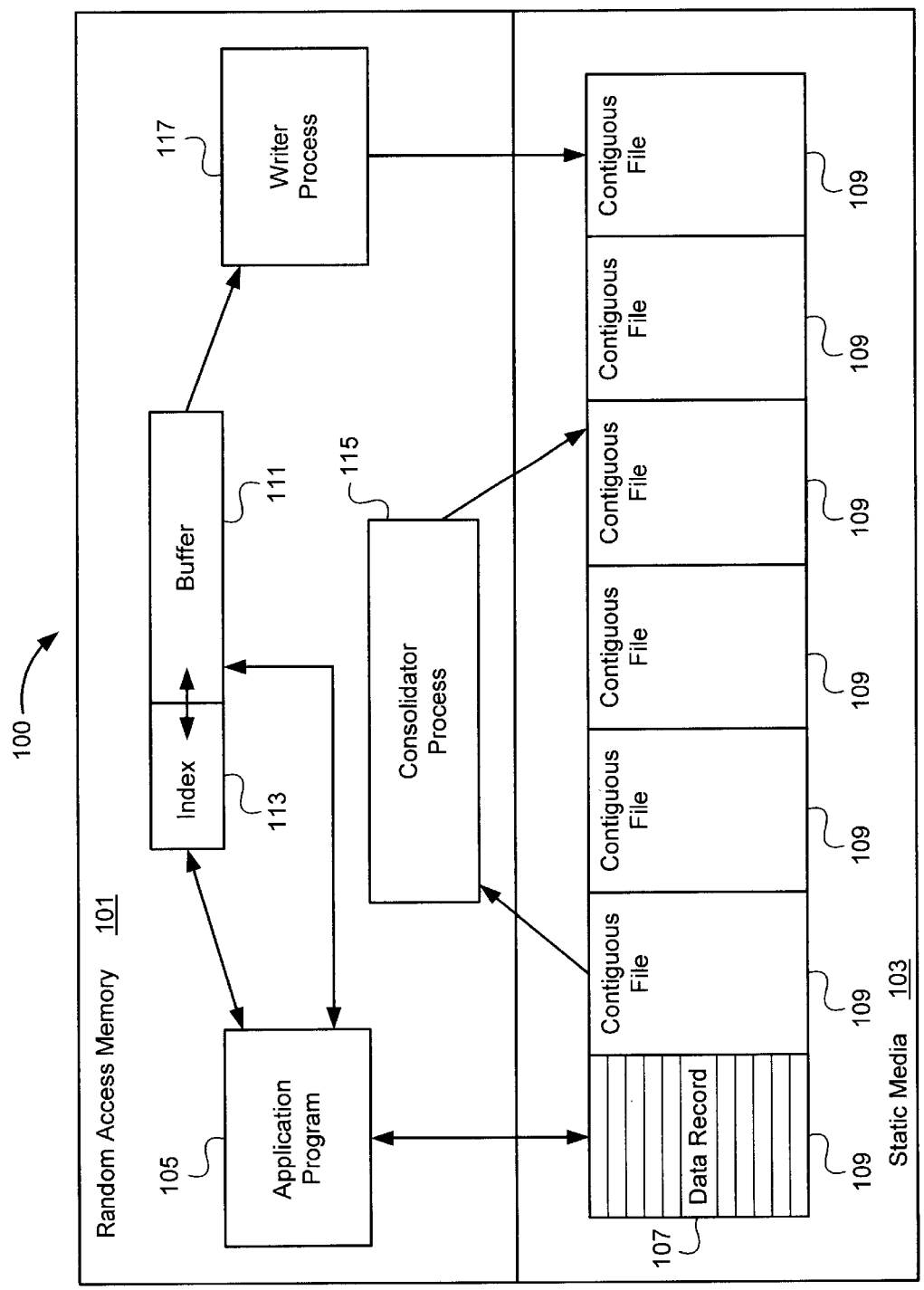
FIG. 1A is a high-level block diagram illustrating a system for facilitating fast, efficient database access based upon contiguous storage of data records according to frequency of access, according to one embodiment of the present invention.

FIG. 1A illustrates a system 100 for facilitating fast, efficient database access based upon contiguous storage of data records according to frequency of access, according to one embodiment of the present invention.

A computer includes random access memory 101 and static media 103. Static media 103 can comprise, for example, magnetic or optical disks. A database application program 105 executes in memory 101. It is to be understood that although a single application program 105 is illustrated, the functionality of the application program 105 can be provided by a single program, or by multiple programs and processes as desired. The application program 105 accesses data records 107 in a database. Non-exhaustive examples of access operations include read, write, add and delete. Data records 107 are stored contiguously in one or more files 109 on static media 103. A subset of data records 107 are stored in a buffer 111 in memory 101. Additionally, an index 113 is stored in memory 101, the index 113 facilitating access of data records 107 stored both on static media 103 and in the buffer 111. The index 113 generally contains information such as the location of each data record 107 on static media 103 (and in memory 101 where applicable), keywords associated with the data record 107, indicators of locked records 107, and the like. The implementation details of the index 113 will be readily apparent to one of skill in the art.

A consolidator process 115 also executes in memory 101. As explained in detail below, the consolidator process 115 contiguously stores non-obsolete data records 107 in available files 109, and makes obsolete files 109 available to the system 100.

A writer process 117 also executes in memory 101. The writer process 117 reads data records 107 from the buffer 111 in memory 101, and contiguously stores the data records 107 in available files 109 on static media 103. As explained in detail below, this results in the most frequently accessed data records 107 being stored contiguously.

II. Overview of System Operation

Figure 1B:
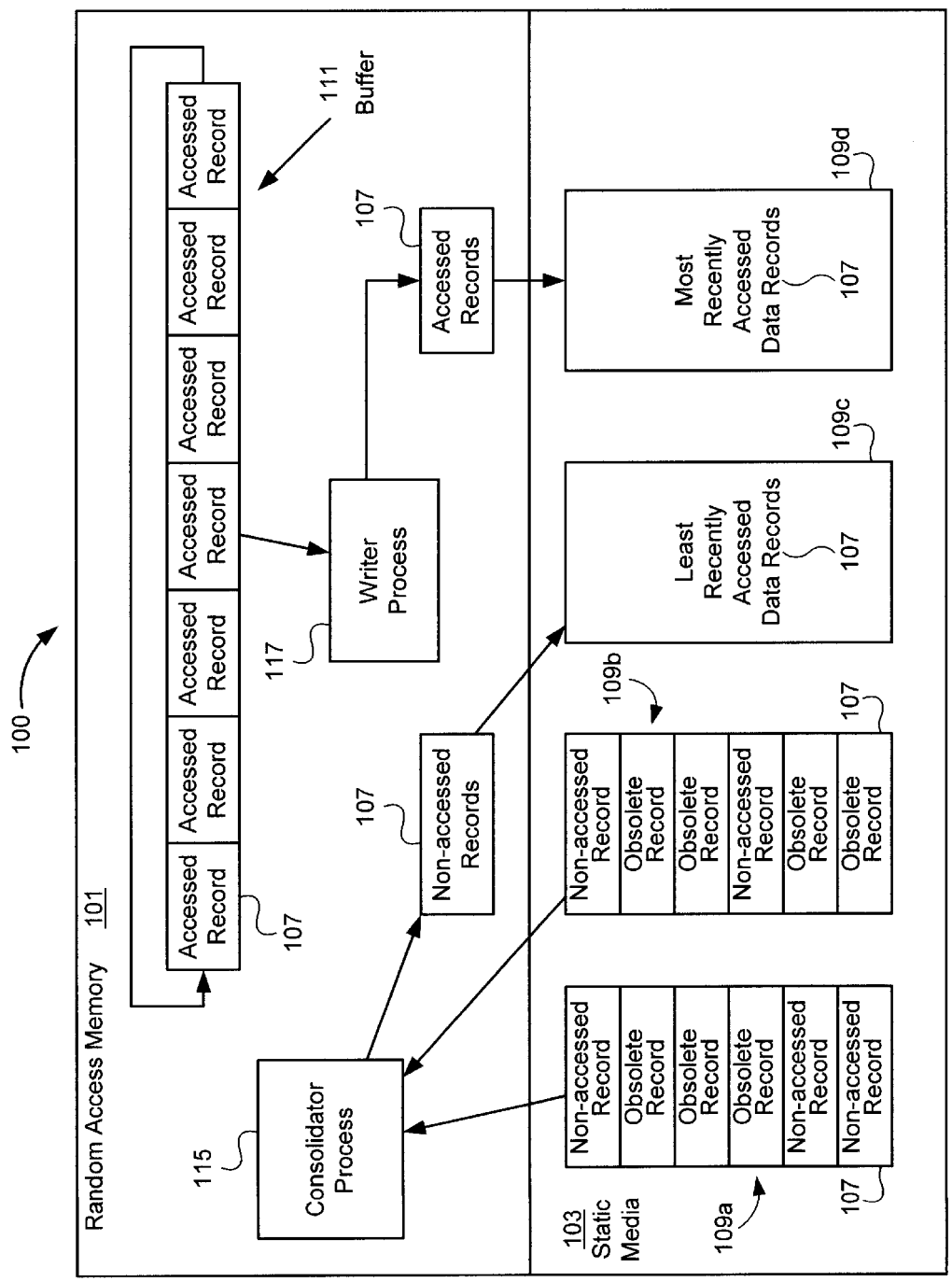
FIG. 1B is a high-level block diagram illustrating an overview of the operation of the system according to one embodiment of the present invention.

FIG. 1B illustrates an overview of the operation of the system, according to one embodiment of the present invention. The operation is based upon the premise that the most recently accessed data records 107 statistically tend to be the most frequently accessed data records 107. Thus, by contiguously grouping both the most frequently and least frequently accessed data records 107, access of data records 107 during system 100 operation will tend to be in a contiguous as opposed to a random order. Because contiguous access involves significantly less disk-head movement than random access, the system 100 yields significantly improved performance over traditional database technologies.

The operation of the system 100 implements this approach by dynamically, contiguously, and separately grouping both the most frequently and least frequently accessed data records 107. As explained in detail below, the system 100 operation begins with all data records 107 stored contiguously in files 109 on static media 103. When a data record 107 is accessed, it is stored in the buffer 111, such that the most recently accessed data records 107 are stored therein, for fast subsequent access.

It will be readily apparent that the buffer 111 will in time become full. Therefore, from time to time, the writer process 117 reads the buffer 111, and contiguously writes data records 107 stored therein to static media 103. Recall that these data records 107 have been recently accessed, and hence they are in the buffer 111. When the writer process 117 flushes the most recently accessed records 107 to media 103, the result is that the most recently accessed records will be stored contiguously, as illustrated in file 109d for fast subsequent access. The system 100 then keeps track of the fact that the flushed version of the data record 107 is the current version, and that the previous version, which was loaded from media 103 into the buffer 111 for access, is now obsolete.

The files 109a, 109b from which data records 107 are loaded into the buffer 111 for access will, in time, comprise both obsolete records 107 (that is to say, records that have subsequently been accessed and contiguously written to a separate file 109d on static media 103) and non-obsolete records 107 (that is to say, records that have not been subsequently accessed and written to a separate file 109d). It will be readily apparent that the obsolete records 107 comprise earlier versions of the most recently accessed data records 107, which have been subsequently contiguously written to a separate file 109d. The non-obsolete records 107 comprise the least recently accessed records 107. In other words, the non-obsolete records 107 have not subsequently been accessed and rewritten since being stored in their current location on static media 103.

As the most frequently accessed records 107 are contiguously stored, so too are the least frequently accessed records 107 contiguously stored. To achieve this, the consolidator process 115 reads files 109a, 109b stored on static media 103. Where a file 109a, 109b contains both non-obsolete records 107 and obsolete records 107, the consolidator process 115 writes the non-obsolete records 107 to a separate file 109c on static media 103, such that they are stored contiguously for subsequent access. Obsolete records can be skipped, since the updated versions of such records have already been written to file 109d. The consolidator process 115 then classifies the file 109a, 109b containing non-obsolete records 107 and obsolete records 107 as being available for subsequent contiguous storage of data records 107, by either the writer process 117 or the consolidator process 115. That is, this area of static media is reclaimed. In this manner, the most recently accessed and the least recently accessed data records 107 are both stored contiguously.

III. Pre-allocation of Contiguous Media

Figure 2:
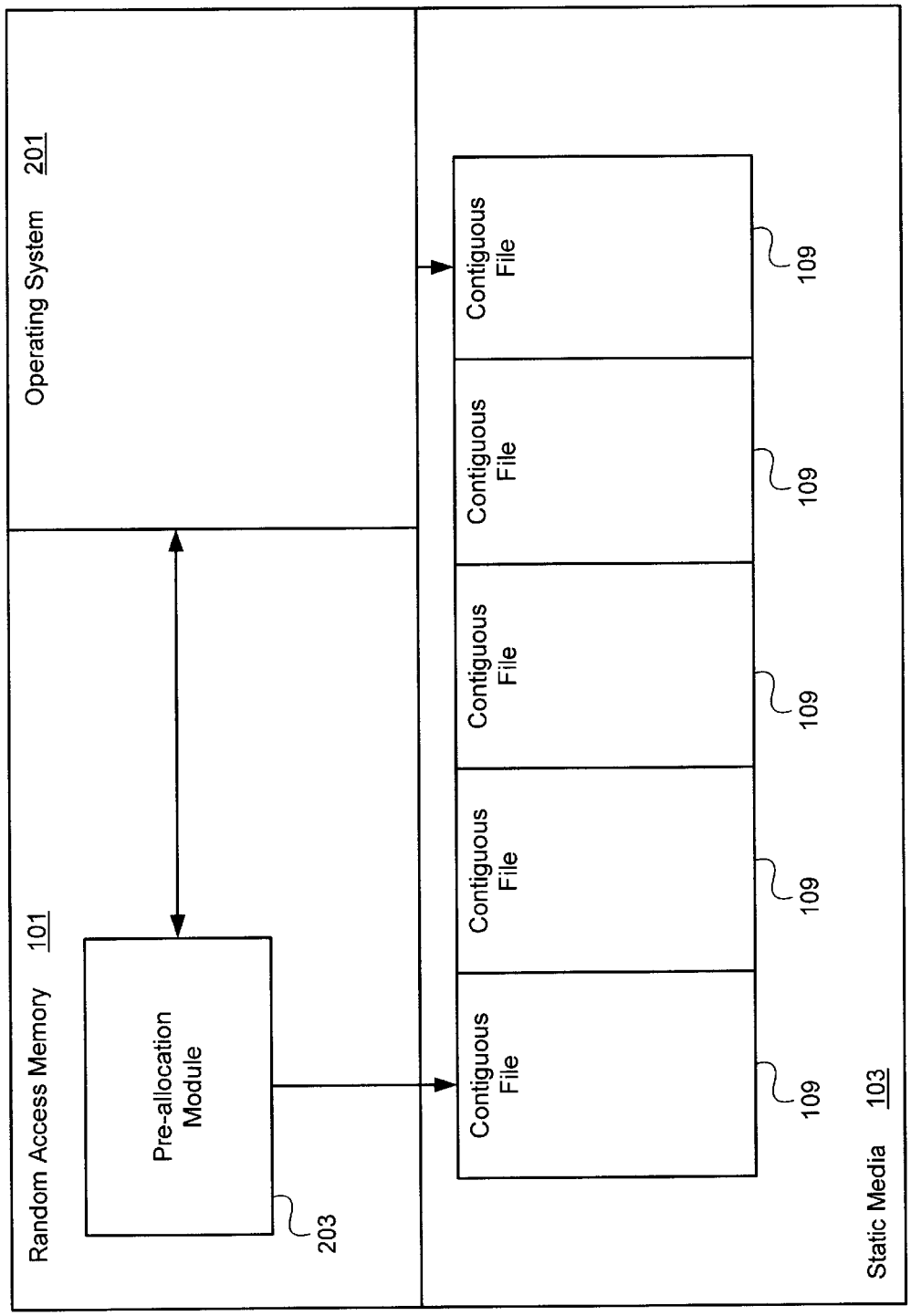
FIG. 2 is a block diagram illustrating the pre-allocation of contiguous files on static media, according to one embodiment of the present invention.

FIG. 2 illustrates the pre-allocation of contiguous files 109 on static media 103. In order to contiguously store data records 107, one or more contiguous files 109 are pre-allocated from an operating system 201. Generally, this pre-allocation is performed by a pre-allocation module 203, which can be a part of the application program 105, or a separate process as desired. In one embodiment, the pre-allocation module 203 allocates a desired number of files 109, each file 109 being a desired number N bytes in size. The pre-allocation module 203 sequentially writes N bytes to each file 109, to ensure that each file 109 occupies contiguous physical storage space on the static media 103. In other embodiments, other techniques known in the art are utilized to ensure contiguous physical allocation of file space on static media 103.

In one embodiment, the physical space on which all of the files 109 are stored is contiguous. In other embodiments, each file 109 comprises contiguous storage space on static media 103, but one or more of the files 109 may be stored non-contiguously relative to other files 109.

IV. Detailed System Operation

Figure 3:
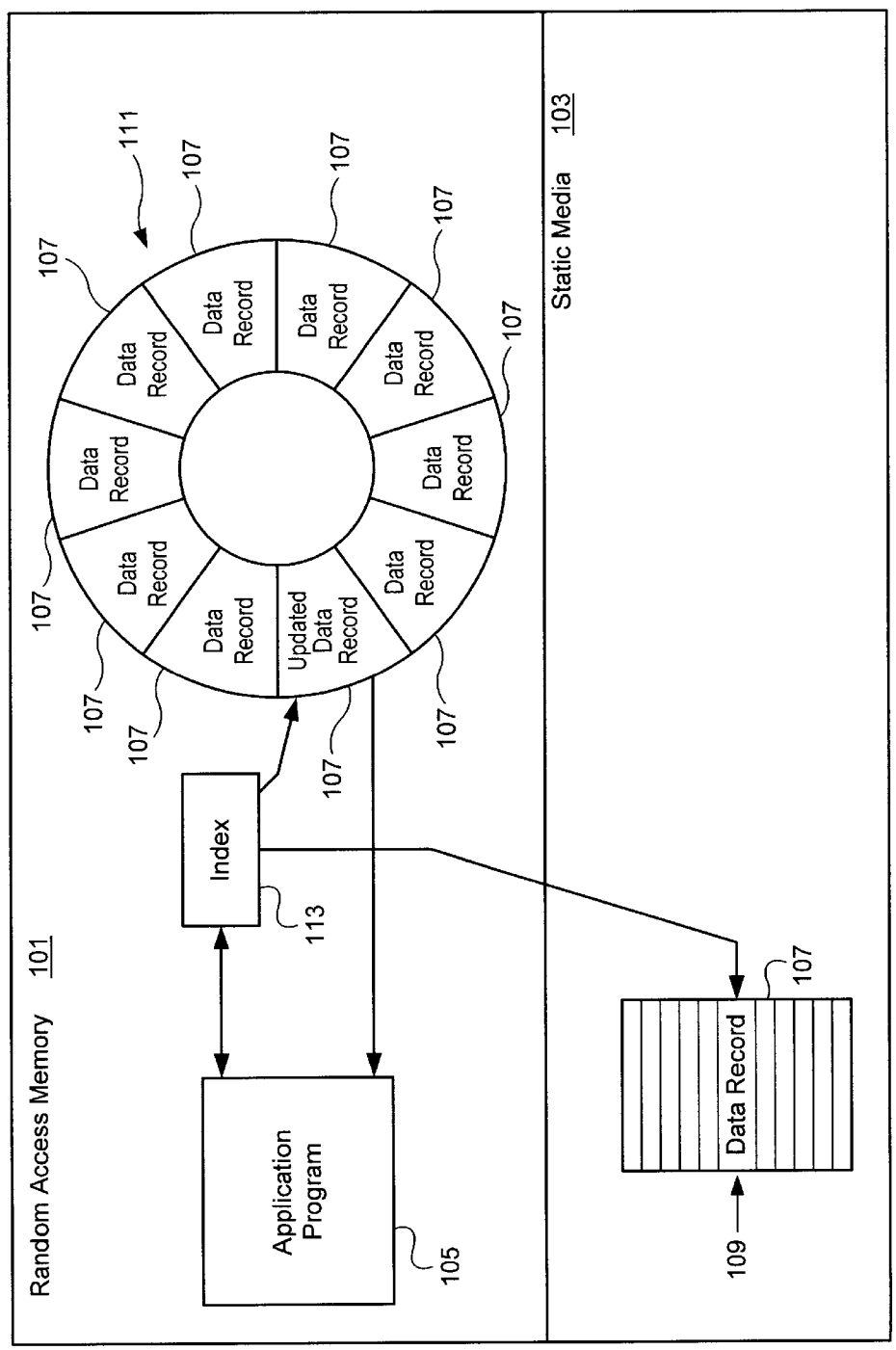
FIG. 3 is a block diagram illustrating the operation of the system, according to one embodiment of the present invention.

FIG. 3 illustrates the operation of the system. Data records 107 are stored contiguously in one or more files 109 on static media. The most recently (and hence most frequently) accessed data records 107 are also stored in a buffer 111 in memory 101. The buffer is large enough to hold some number M data records. The value of M is generally configurable, and comprises a design choice to be made by a system administrator or other party as desired. As explained above, the index 113 is also stored in memory 101.

The application program 105 utilizes the index 113 to access data records 107. Where an accessed record 107 is already in the buffer 111, the application program 105 utilizes the buffered copy of the data record 107 for fast access. Where the data record 107 is not in the buffer 111, the application program 105 loads the data record from static is media 103 into memory 101, and stores a copy of the data record 107 in the buffer 111. If there is room in the buffer 111, the data record 107 is simply stored there in available space. If the buffer 111 is full, the least recently accessed data record 107 (or alternatively some other data record 107) is overwritten. Of course, data records 107 that have been updated are not overwritten without first being written to static media 103 by the writer process 117, as explained below. When a data record 107 is stored in the buffer 111, the index 113 is updated to indicate the location of the data record 107 therein.

In one embodiment, the buffer 111 comprises a circular queue (as illustrated in FIG. 3). In that embodiment, data records 117 are stored at the tail of the queue, such that when the queue is full, the least recently entered data records 107 are overwritten with new data records 107. Other data structures and storage methodologies are utilized in other embodiments as desired.

It is to be understood that some accesses of data records 107 update the contents thereof (e.g. a write operation), whereas other accesses do not (for example, a read operation). In one embodiment, only updated data records 107 are stored in the buffer 111. In another, all accessed records 107 are so stored. Regardless, the application program 105 (or alternatively another element of the system 100) keeps track of which data records 107 in the buffer 111 have been updated since they were loaded from static media 103. The application program 105 uses entries in the index 113, or other conventional methodology apparent to one of skill in the art, to keep track of this information.

V. Writing of Records from Buffer to Media

Figure 4:
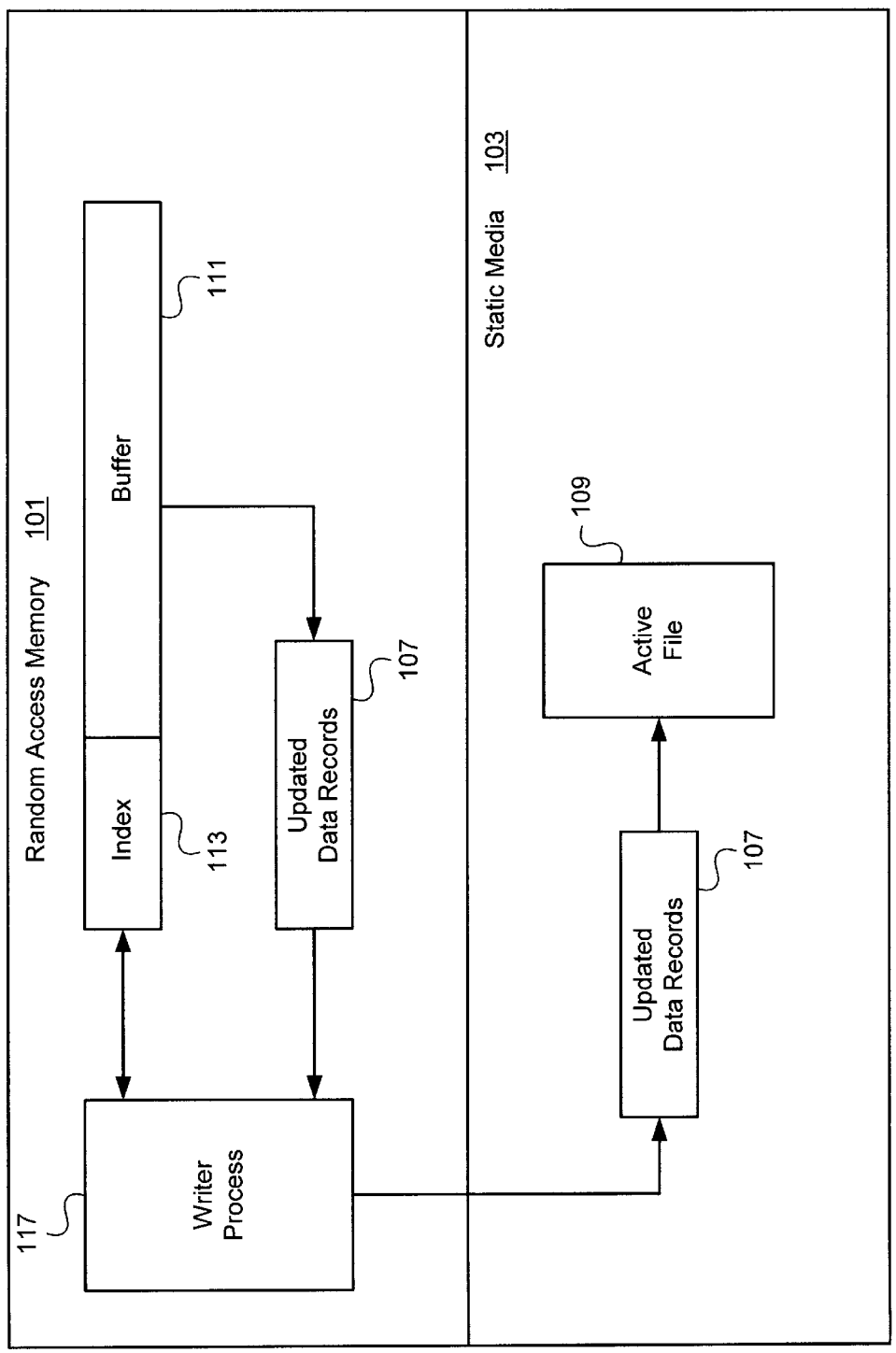
FIG. 4 is a block diagram illustrating the writing of data records stored in the buffer to static media, according to one embodiment of the present invention.

FIG. 4 illustrates the writing of data records 107 stored in the buffer 111 to static media 103. A writer process 117 executes in memory 101. FIG. 4 illustrates the writer process 117 executing as a discrete process. It is to be understood that the associated functionality can be provided by a single process as illustrated, by the application program, or by more than one process or program as desired.

From time to time as desired, the writer process 117 reads the buffer, and contiguously stores data records 107 contained therein in one or more files 109 on static media 103. Generally, the writer process 117 determines which records 107 in the buffer 111 have not been stored on media 103 since last being updated, as described below. The writer process 117 contiguously appends these records 107 to an active file 109 on static media 103. An active file 109 is a file 109 in which the writer process 117 stores updated records 107 from the buffer 111, the active file 109 having available room for additional records 107. Generally, an active file 109 is a file that is available for storage of records 107, either as a result of being pre-allocated by the pre-allocation module 201, or as a result of having been made available by the consolidation process 115, as explained below. Once an active file 109 becomes full, the system 100 designates a new available file 109 as being active, and begins storing records 107 therein. The full file 109 is designated as no longer being active or available.

The writer process 117 (or alternatively the application program 105) keeps track of which records 107 in the buffer 111 have been copied to static media. The writer process 117 uses entries in the index 113, or other conventional methodology apparent to one of skill in the art, to keep track of this information. Because the system 100 keeps track of which records 107 in the buffer 111 have been updated since being copied from media 103, and which updated records 107 in the buffer 111 have been written to media 103, the writer process 117 is able to only contiguously write those records 107 to media 103 that are more current than the latest version stored on media. Additionally, when the writer process 117 copies an updated data record 107 to static media, the system 100 classifies earlier versions of the data record 107 stored on media as being obsolete. The system uses methodology apparent to one of skill in the art to keep track of obsolete records.

The frequency with which the writer process 117 executes is configurable, and comprises a design choice to be made by a system administrator or other party as desired. In some embodiments, the writer process 177 executes at least whenever the buffer 111 is full, such that before an updated data record 107 is overwritten, all updated data records 107 are contiguously written to one or more active files 109 on media 103.

Additionally, when the writer process 117 contiguously writes data records from the buffer 111 to media 103, the index 113 is updated accordingly.

VI. Consolidation of Records on Media

Figure 5:
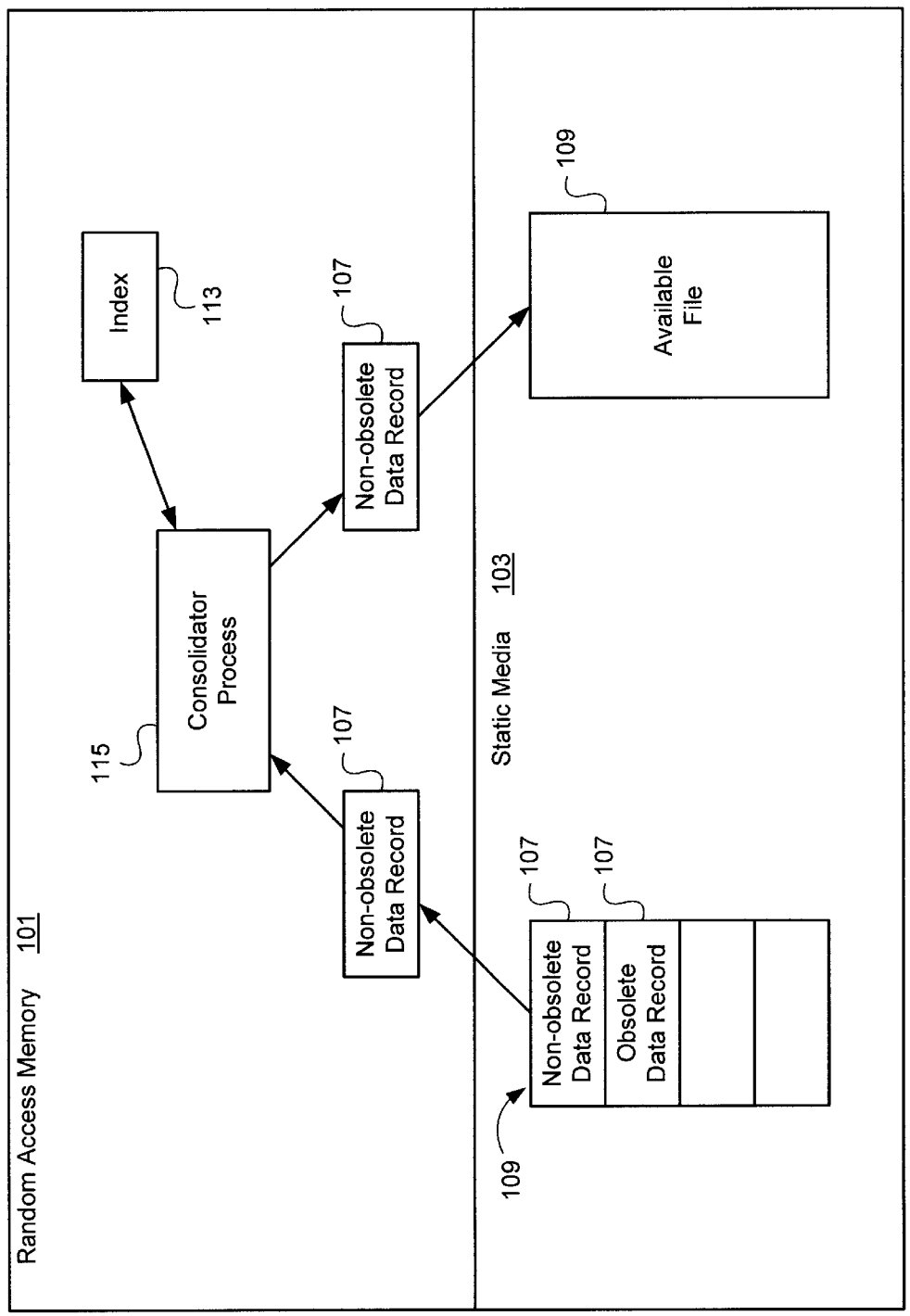
FIG. 5 is a block diagram illustrating the consolidation of data records stored on static media, according to one embodiment of the present invention.

FIG. 5 illustrates the consolidation of data records 107 stored on static media 103. A consolidator process 115 executes in memory 101. FIG. 5 illustrates the consolidator 115 as a single process, but of course the associated functionality can alternatively be provided by the application program, or by more than one process or program as desired.

From time to time as desired, the consolidator process 115 reads the files 109 on static media 103 in which data records 107 are stored. When the consolidator process 115 encounters a file 109 in which both obsolete and non-obsolete records are stored, the consolidator process 115 reads the non-obsolete records 107 from that file 109, and contiguously stores them in an available file 109, such that the least recently accessed data records (in other words, the ones that have not been updated recently, and hence are non-obsolete)

are stored contiguously. The file 109 containing obsolete and non-obsolete records is then classified by the system as being available for subsequent use by the writer process 117 or the consolidator process 115.

The frequency with which the consolidator process 115 executes is configurable, and comprises a design choice to be made by a system administrator or other party as desired. Additionally, when the consolidator process 117 stores data records in available files and classifies existing files as being available, the index 113 is updated accordingly.

VII. Chaining of Records

Figure 6:
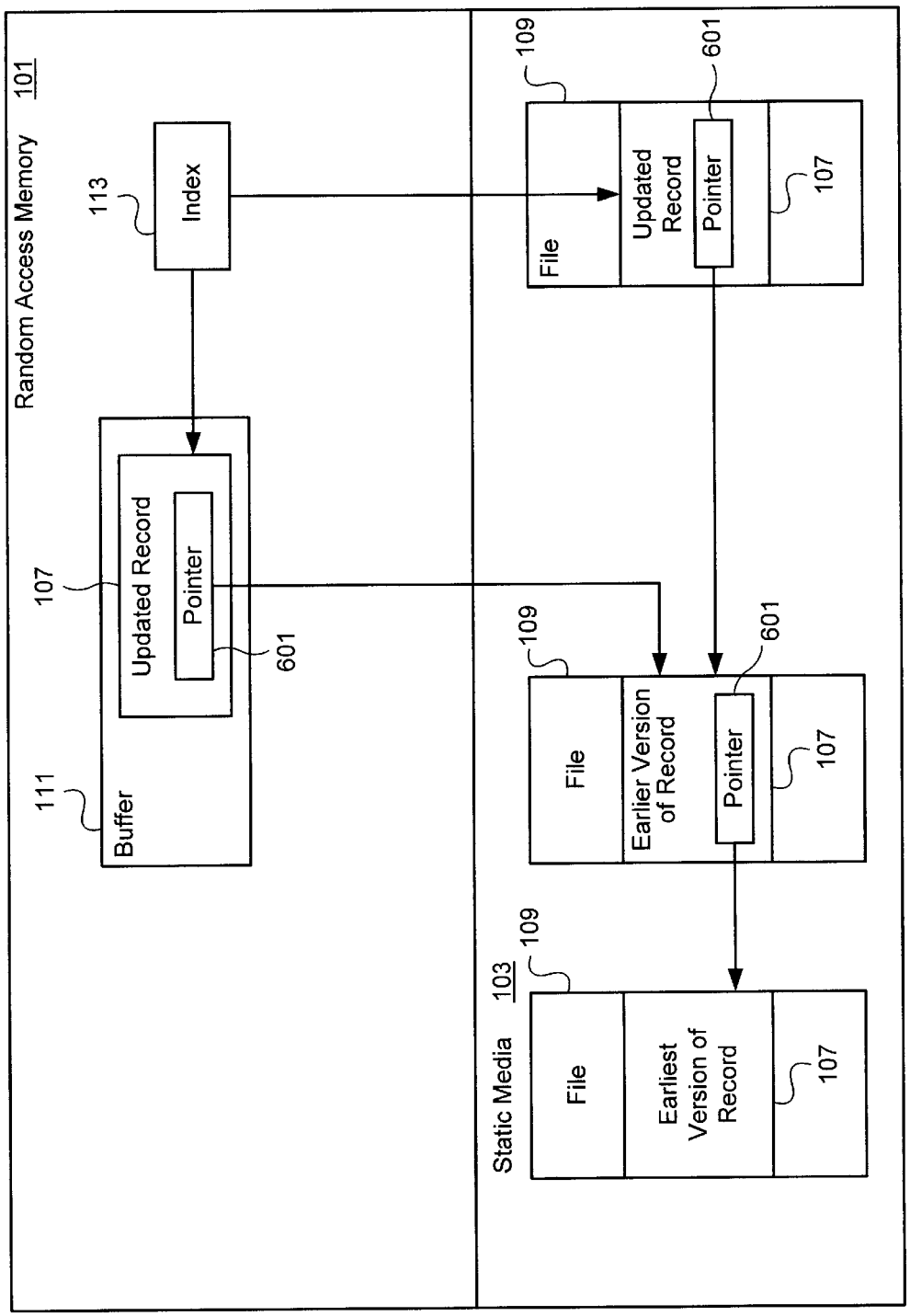
FIG. 6 is a block diagram illustrating the chaining of multiple versions of data records, according to one embodiment of the present invention.

FIG. 6 illustrates the chaining of versions of data records 107. In some embodiments of the present invention, when a data record 107 is updated, a pointer 601 is maintained from the updated data record 107 to the previous version thereof. This pointer 301 can be in the record 107 itself (as illustrated), in the index 113, or elsewhere as desired.

Where each version of a data record 107 has a pointer 301 to the previous version, the "chain" of pointers 301 can be traversed in order to examine editing history of a data record 107. The chain has other uses as well, for example error recovery after a system crash.

In one embodiment, no version of a data record 107 is classified as obsolete until a certain number of more recent versions of the record always exist. For example, a system administrator could configure the system 100 such that three versions of each data record always exist. Then, only when three more recent versions exist would a prior version of a data record be classified as obsolete. In one embodiment, this result is achieved by setting the size of the buffer 111 and files 109, as well as the execution frequency of the writer process 117 and the consolidator process 115 accordingly.

VIII. Flexibility of Record Type

Data records 107 can comprise data of any kind, for example, names and addresses, employee information, inventory information, or profiles summarizing transactions, for example credit card transactions. Data records 107 can be exported or imported into other applications as desired. For example, in one embodiment, data records 107 comprise profiles summarizing credit card transactions. These profiles are utilized as input for a predictive statistical modeling program. In another embodiment, the profiles comprise output from the predictive statistical modeling program.

IX. Conclusion

The system 100 contiguously stores the most recently accessed data records 107 together, and contiguously stores the least recently accessed records 107 together. The most recently accessed records 107 are maintained in the buffer 111 and contiguously written to active files 109 on static media 103. The least recently accessed data records 107 are contiguously stored in available files 107 on static media 103. Because the storage of both the most and least recently (and thus frequently) accessed data records 107 is contiguous, a minimum of disk-head movement is required in order to read and write the data records 107. Because the mechanical operation of disk-head movement is significantly slower than the other, electrical operations required for data record 107 access, the system 100 provides remarkable performance improvements over previously known database technologies.

As will be understood by those familiar with the art, the invention may be embodied in other specific forms without departing from the spirit or essential characteristics thereof. Likewise, the particular capitalization or naming of the modules, protocols, features, attributes or any other aspect is not mandatory or significant, and the mechanisms that implement the invention or its features may have different names or formats. Additionally, it will be readily apparent to one of skill in the art that functionality described herein can be implemented as software, hardware, firmware or any desired combination thereof. All such instantiations are within the scope of the present invention. Accordingly, the disclosure of the present invention is intended to be illustrative, but not limiting, of the scope of the invention, which is set forth in the following claims.

What is claimed is:

1. A method in a computer system for facilitating quick access of stored data, the method comprising:

storing a plurality of data records on media, in at least one contiguous file;

storing a subset of the data records in electronic computer memory, the subset comprising the most recently accessed data records;

storing an index in said electronic computer memory, said index facilitating access of said stored plurality of data records on media and said subset of said data records stored in said electronic computer memory, said subset of facilitating access comprising keeping track of which of said subset of said data records stored in said electronic computer memory are updated since having been stored from said media;

contiguously writing at least a portion of the subset of data records stored in electronic computer memory to at least one available file on media, wherein a frequency of executing said step of contiguously writing is configurable;

for at least one file on media, classifying as obsolete data records therein that have subsequently been written to another file;

contiguously copying non-obsolete data records from said at least one file on media to at least one available file on media and skipping said obsolete data records, wherein a frequency of executing said step of contiguously copying is configurable; and classifying said at least one file on media from which non-obsolete data records were copied and wherein said obsolete data records are skipped as available for subsequent contiguous storage of data records from any of said electronic computer memory and said media;

where rein said at least one contiguous fit from which said subset of the data records are stored in electronic computer memory can subsequently comprise both obsolete data an non-obsolete data; and wherein when any available file is full, a new available file is designated as active and said any full available file is designated as no longer active and no longer available.

2. The method of claim 1, further comprising:

pre-allocating at least one contiguous region of media, for contiguous storage of at least one file.

3. The method of claim 1, further comprising:

pre-allocating n contiguous files of m bytes each on blank media, where n and m are integers greater than or equal to one.

4. The method of claim 1, wherein:

the portion of the subset of the data records in electronic computer memory that is contiguously written to media comprises data records that have not been written to media since having been updated.

5. The method of claim 1, further comprising:

storing the subset of the data records in electronic computer memory in a circular queue.

6. The method of claim 1, further comprising:
storing the subset of the data records in electronic computer memory in a variable sized buffer.

7. The method of claim 1, further comprising:
responsive to an attempt to access a data record, determining whether the data record is in electronic computer memory; and
responsive to a determination that the data record is not in electronic computer memory, loading the data record into electronic computer memory.

8. The method of claim 1, further comprising:
updating an existing data record;
storing the updated data record; and
storing a pointer from the updated data record to the existing data record.

9. The method of claim 8, further comprising:
utilizing the pointer to trace changes to a data record.

10. The method of claim 8, further comprising: utilizing the pointer to recover a corrupted data record.

11. The method of claim 1, wherein:
data records comprise profiles, a profile being data that summarizes at least one transaction.

12. The method of claim 11, wherein:
at least one profile is used as input for predictive statistical modeling program.

13. The method of claim 11, wherein:
at least one profile comprises output from a predictive statistical modeling program.

14. A computer program product for facilitating quick access of stored data, the computer program product comprising:
program code for storing a plurality of data records on media, in at least one contiguous file;
program code for storing a subset of the data records in electronic computer memory, the subset comprising the most recently accessed data records;
program code for storing an index in said electronic computer memory, said index facilitating access of said stored plurality of data records on media and said subset of said data records stored in said electronic computer memory, said step of facilitating access comprising keeping track of which of said subset of said data records stored in said electronic computer memory are updated since having been stored from said media;
program code for contiguously writing at least a portion of the subset of data records stored in electronic computer memory to at least one available file on media, wherein a frequency of executing said step of contiguously writing is configurable;
program code for classifying as obsolete, for at least one file on media, data records therein that have subsequently been written to another file;
program code for contiguously copying non-obsolete data records from said at least one file on media to at least one available file on media and skipping said obsolete data records, wherein a frequency of executing said step of contiguously copying is configurable;
program code for classifying said at least one file on media from which non-obsolete data records were copied and wherein said obsolete data records are skipped as available for subsequent contiguous storage of data records from any of said electronic computer memory and said media; and
a computer readable medium on which the program codes are stored;

wherein said at least one contiguous file from which said subset of the data records are stored in electronic computer memory can subsequently comprise both obsolete data non-obsolete data; and
wherein when any available file is full, a new available file is designated as active and said any full available file a designated as no longer active and no longer available.

15. The computer program product of claim 14, further comprising:
program code for pre-allocating at least one contiguous region of media, for contiguous storage of at least one file.

16. The computer program product of claim 14, further comprising:
program code for pre-allocating n contiguous files of m bytes each on blank media, where n and m are integers greater than or equal to one.

17. The computer program product of claim 14, further comprising:
program code for contiguously writing data records that have not been written to media since having been updated to at least one file on media.

18. The computer program product of claim 14, further comprising:
program code for storing the subset of the data records in electronic computer memory in a circular queue.

19. The computer program product of claim 14, further comprising:
program code for storing the subset of the data records in electronic computer memory in a variable sized buffer.

20. The computer program product of claim 14, further comprising:
program code for determining, response to an attempt to access a data record, whether the data record is in electronic computer memory; and
program code for loading the data record into electronic computer memory, responsive to a determination that the data record is not in electronic computer memory.

21. The computer program product of claim 14, further comprising:
program code for updating an existing data record;
program code for storing the updated data record; and
program code for storing a pointer from the updated data record to the existing data record.

22. The computer program product of claim 21, further comprising:
program code for utilizing the pointer to trace changes to a data record.

23. The computer program product of claim 21, further comprising:
program code for utilizing the pointer to recover a corrupted data record.

24. The computer program product of claim 14, further comprising:
program code for using at least one data record that summarizes at least one transaction as input for a predictive statistical modeling program.

25. The computer program product of claim 14, further comprising:
program code for receiving at least on data record that summarizes at least one transaction as output from a predictive statistical modeling program.

26. A computer system for facilitating quick access of stored data, the computer system comprising:

a storage module, for storing a plurality of data records on media, in at least one contiguous file;

a sub-set storage module, for storing a subset of the data records in electronic computer memory, the subset comprising the most recently accessed data records, the sub-set storage module being coupled to the storage module;

an index module for facilitating access of said stored plurality of data records on media and said subset of said data records stored in said electronic computer memory, said step of facilitating access comprising keeping track of which of said subset of said data records stored in said electronic computer memory are updated since having been stored from said media, the index module being coupled to the sub-set storage module;

a writing module, for contiguously writing at least a portion of the subset of data records stored in electronic computer memory to at least one available file on media, wherein a frequency of executing said step of contiguously writing is configurable, the writing module being coupled to the sub-set storage module;

a classification module, for classifying as obsolete, for at least one file on media, data records therein that have subsequently been written to another file, the classification module being coupled to the writing module;

a copying module, for contiguously copying non-obsolete data records from said at least one file on media at least one available file on media and skipping said obsolete data records, wherein a frequency of executing said step of contiguously copying is configurable, the copying module being coupled to the classification module; and an availability-classification module, for classifying said at least one file on media from which non-obsolete data records were copied and wherein said obsolete data records are skipped as available for subsequent contiguous storage of data records from any of said electronic computer memory and said media, the availability-classification module being coupled to the copying module;

wherein said at least one contiguous file from which said subset of the data records are stored in electronic computer memory can subsequently comprise both obsolete data and non-obsolete data; and wherein when any available file is full, a new available file is designated active, and said any full available file is designated as no longer active and no longer available.

27. The computer system of claim 26, further comprising:

a pre-allocation module, for pre-allocating at least one contiguous region of media, for contiguous storage of at least one file, the pre-allocation module being coupled to the storage module.

28. The computer system of claim 26, further comprising:

a pre-allocation module, for pre-allocating n contiguous files of m bytes each on blank media, where n and m are integers greater than or equal to one, the pre-allocation module being coupled to the storage module.

29. The computer system of claim 26, wherein:

the writing module is further for contiguously writing to media data records in electronic computer memory that have not been written to media since having been updated.

30. The computer system of claim 26, wherein:

the sub-set storage module is further for storing the subset of the data records in electronic computer memory in circular queue.

31. The computer system of claim 26, further comprising:

the sub-set storage module is further for storing the subset of the data records in electronic computer memory in a variable sized buffer.

32. The computer system of claim 26, further comprising:

a determination module, for determining, responsive to an attempt to access a data record, whether the data record is in electronic computer memory, the determination module being coupled to the sub-set storage module; and a loading module, for loading the data record into electronic computer memory responsive to a determination that the data record is not in electronic computer memory, the loading module being coupled to the determination module.

33. The computer system of claim 26, further comprising:

an updating module, for updating an existing data record, the updating module being coupled to the sub-set storage module;

an updated-record storage module, for storing the updated data record, the updated-record storage module being coupled to the updating module; and a pointer storage module, for storing a pointer from the updated data record to the existing data record, the pointer storage module being coupled to the updated-record storage module.

34. The computer system of claim 33, further comprising:

a pointer utilization module, for utilizing the pointer to trace changes to a data record, the pointer utilization module being coupled to the pointer storage module.

35. The computer system of claim 33, further comprising:

a pointer utilization module, for utilizing the pointer to recover a corrupted data record, the pointer utilization module being coupled to the pointer storage module.

36. The computer system of claim 26, further comprising:

a data record utilization module, for utilizing at least one data record that summarizes at least one transaction as input for a predictive statistical modeling program, the data record utilization module being coupled to the storage module.

37. The computer system of claim 26, further comprising:

a data record reception module, for receiving at least one data record that summarizes at least one transaction as output from a predictive statistical modeling program, the data record reception module being coupled to the storage module.

38. A method in a computer system for facilitating quick access of stored data, the method comprising:

loading accessed data records into computer memory;

dynamically consolidating data records accessed most recently by contiguously flushing accessed data records from computer memory to a separate file on static media; and dynamically consolidating data records accessed least recently by writing non-accessed data records to a separate file on static media;

wherein when any of said separate files is full, a new separate file is designated as active and available for subsequent storage; and wherein when any separate file comprises only obsolete records and non-access records previously copied to another separate file, said an separate file is designated as obsolete and available for subsequent storage.

* * * * *

UNITED STATES PATENT AND TRADEMARK OFFICE
CERTIFICATE OF CORRECTION

PATENT NO. : 6,691,136 B2
DATED : February 10, 2004
INVENTOR(S) : Lee et al.

It is certified that error appears in the above-identified patent and that said Letters Patent is hereby corrected as shown below:

<u>Title page,</u>
Item [74], *Attorney, Agent, or Firm*, replace "Glenn Patent Group; Michael A. Glenn" with -- Robert Sachs; Fenwick & West LLP; Michael A. Glenn; Julia A. Thomas; Glenn Patent Group --

Signed and Sealed this

Thirteenth Day of April, 2004

JON W. DUDAS
*Acting Director of the United States Patent and Trademark Office*